(12) United States Patent
Kerner et al.

(10) Patent No.: US 6,298,750 B1
(45) Date of Patent: Oct. 9, 2001

(54) STEERING WHEEL FOR A MOTOR VEHICLE, AND A METHOD FOR PRODUCING A STEERING WHEEL RIM

(75) Inventors: Wolfgang Kerner, Eutingen; Manfred Link, Waiblingen; Claudia Nowak, Oberboihingen; Helmut Patzelt, Kernen, all of (DE)

(73) Assignees: DaimlerChysler AG, Stuttgart; TRW Automotive Safety Systems GmbH, Aschaffenburg, both of (DE)

( * ) Notice: Subject to any disclaimer, the term of this patent is extended or adjusted under 35 U.S.C. 154(b) by 0 days.

(21) Appl. No.: 09/382,828

(22) Filed: Aug. 25, 1999

(30) Foreign Application Priority Data

Aug. 25, 1998 (DE) .............................. 198 38 452

(51) Int. Cl.[7] .................................................... B62D 1/06
(52) U.S. Cl. ............................................. 74/552; 454/152
(58) Field of Search .................. 74/552, 558, 558.5, 74/551.5; 454/152

(56) References Cited

U.S. PATENT DOCUMENTS

| | | | |
|---|---|---|---|
| 1,088,796 | * | 3/1914 | Schroyer ......... 74/552 |
| 1,093,441 | * | 4/1914 | Laurance ......... 74/552 |
| 1,101,417 | * | 6/1914 | Dover ......... 74/552 |
| 1,174,215 | * | 3/1916 | Wiegand ......... 74/552 |
| 1,412,678 | * | 4/1922 | Dover ......... 74/552 |
| 1,823,563 | * | 9/1931 | Husted ......... 74/552 |
| 1,825,393 | * | 9/1931 | Geyer ......... 74/552 |
| 2,146,703 | * | 3/1939 | Husted ......... 74/552 |
| 2,163,450 | * | 2/1939 | Preble ......... 74/552 |
| 4,082,276 | * | 4/1978 | Szafianski ......... 273/73 R |
| 4,205,221 | * | 5/1980 | Meyer ......... 219/230 |
| 4,623,795 | * | 11/1986 | Knopp et al. ......... 250/504 H |
| 4,898,172 | * | 2/1990 | Grable ......... 128/397 |
| 5,074,006 | * | 12/1991 | Eremita ......... 15/344 |
| 5,850,741 | * | 12/1998 | Feher ......... 62/3.61 |
| 6,007,420 | * | 12/1999 | Harm et al. ......... 454/152 |

FOREIGN PATENT DOCUMENTS

| | | |
|---|---|---|
| 2 164 976 | 7/1973 | (DE) . |
| 37 13 450 | 11/1988 | (DE) . |
| JP 60-60066 | 4/1985 | (JP) . |
| 61-53268 | 4/1986 | (JP) . |
| JP 2-96267 | 7/1990 | (JP) . |

OTHER PUBLICATIONS

Japanese Patent Office Action dated Apr. 25, 2001.

* cited by examiner

*Primary Examiner*—David A. Bucci
*Assistant Examiner*—Chong H. Kim
(74) *Attorney, Agent, or Firm*—Crowell & Moring LLP

(57) ABSTRACT

Steering wheel having a steering wheel rim which is hollow at least in some places and has ventilation openings for stabilizing the temperature of the steering rim. In the region of the at least one cavity, the steering wheel rim has a holder for fixing a fan module which sucks in environmental air and passes it into the cavity.

12 Claims, 2 Drawing Sheets

STEERING WHEEL FOR A MOTOR VEHICLE, AND A METHOD FOR PRODUCING A STEERING WHEEL RIM

BACKGROUND AND SUMMARY OF THE INVENTION

This application claims the priority of German patent 198 38 452.1, filed Aug. 25, 1998, the disclosure of which is expressly incorporated by reference herein.

The invention relates to a steering wheel for a motor vehicle having a steering wheel rim which is connected to a steering wheel hub by way of a supporting structure, in particular a spoke arrangement, in which case the steering wheel rim is provided at least in some places with at least one cavity which is open, through at least one ventilation opening to a gripping region of the steering wheel rim.

It is known for example from German patent document DE 37 13 450 A1, for the temperature of a steering wheel of a motor vehicle to be stabilized by heating or cooling. For this purpose, a steering wheel rim is part of a funnel-like supporting structure, with the entire supporting structure including the steering wheel rim being designed to be hollow. The casing of the steering wheel rim is provided with outlet openings all the way around for air at an appropriately stabilized temperature. The steering wheel has a relatively complex associated circuit for the temperature-stabilization medium.

A similar steering wheel for a motor vehicle is known from German patent document DT 21 64 976. A steering wheel rim is provided with a circumferential annular channel which is connected, at the level of two spokes, to supply channels which run through the spokes. The supply channels are routed in a casing tube, in which case the casing tube can be supplied via appropriate connecting lines with hot air taken from the engine compartment or with fresh air which is taken from the relative wind of motion and is sucked in via a fan.

The object of the invention is to provide a steering wheel of the type mentioned initially, in which it is possible to stabilize the temperature of the steering wheel rim in a simple manner.

This object is achieved in that in the region of the at least one cavity, the steering wheel rim has a holder for fixing a fan module which sucks in air from the vicinity of the steering wheel rim and passes it into the cavity. The invention is based on the knowledge that, owing to the airbag units which are fitted in modern vehicles, there is not enough space in the body of the steering wheel for a suitable practical configuration for known solutions for routing an air channel from the casing tube region to the steering wheel rim. By directly fixing the fan module to the steering wheel rim, there is no need for air supply channels since the fan module sucks in environmental air directly and passes it into the at least one cavity. In this case, environmental air is sucked in in the immediate vicinity of the steering wheel rim. The cooling effects of appropriate ventilation is provided by the gradual circulation of the air in the vehicle interior, in which case, owing to the flow conditions there, cooler air is also gradually sucked in out of the casing tube and footwell region of the vehicle interior in addition to the environmental air located in the immediate vicinity of the steering wheel rim. The solution according to the invention compensates for the disadvantages of poorer cooling air supply in the initial phase of ventilation in that the resistance to the air flow is considerably reduced owing to the lack of air supply channels. The steering wheel rim can be provided either with a continuous, circumferential cavity or else with cavities which are distributed in sections around the circumference of the steering wheel rim. The at least one ventilation opening is used as an outlet opening for the air supplied by the fan module, and such openings may have different flow geometries. Either a single outlet slot may be provided or, preferably, a large number of irregularly distributed outlet holes. The ventilation openings are preferably arranged only in the gripping region of the steering wheel rim, in which case the gripping regions represent regions where a driver normally grips the steering wheel.

In a refinement of the invention, the steering wheel rim is designed as a self-supporting hollow body structure. The preferably annular hollow body structure is designed such that the hollow body structure itself has sufficient stiffness and strength on its own. Wire inserts or struts, as are present in the steering wheel rim according to the prior art, are avoided in order to achieve good flow conditions with a continuous cavity within the steering wheel rim.

In a further refinement of the invention, the fan module is arranged in an attachment region of the steering wheel rim, at the level of a steering wheel spoke of the spoke arrangement. This is a particularly advantageous arrangement, since the fan module can be integrated in a space-saving manner in the attachment region (which is required in any case) of the steering wheel rim to the spoke arrangement. The fan module preferably has a small fan which is integrated in a tubular sleeve which has an outlet that opens into the cavity at one end as well as an inlet (which is in the form of an induction stub) at the opposite end in the flow direction. The fan module may be designed in a simple manner as a cylindrical tubular section, in which the fan is integrated with its rotation axis aligned coaxially with respect to the center longitudinal axis of the tube. The tubular section in the form of a stub is designed to be relatively short, and one end is embedded in the holder for the steering wheel rim, or is flange-connected to it in some other way.

In a further refinement of the invention, the steering wheel rim is produced with one or more shells from at least one metal sheet. The design of the steering wheel rim from at least one metal sheet allows the ventilation openings to be incorporated without any notches being produced which would lead to weakening of the material. For this reason, it is not directly possible to use metal castings. When using metal sheets, bending loads can be absorbed without the metal sheet failing. The steering wheel rim is preferably assembled from two sheet-metal half shells. However, it may also be formed with a single shell or from three or more shells.

In a further refinement of the invention, the steering wheel rim is formed by two half shells which are connected to one another, in which case a lower half shell is connected to the supporting structure and an upper half shell is provided with the ventilation openings. This refinement allows simple and cost-effective production. If the upper half shell were to be connected to the supporting structure, in particular to the spoke arrangement, then this would result in considerably increased manufacturing effort. The spoke arrangement may comprise a plurality of spokes, in manner known per se, in which case between two and four spokes are preferably provided. Since, in contrast to the prior art, the spokes have nothing to do with the ventilation system, the arrangement and number of spokes may be chosen as required, depending on other requirements such as stability or stylistic demands.

In a further refinement of the invention, the upper half shell is designed as an injection-molded plastic part. The connection between the upper half shell and a lower half shell designed as a sheet-metal part can preferably be provided by a latching or crimped connection. Furthermore, the two half shells can be mechanically connected to one another in a positively locking manner. Latching or crimped connections are particularly advantageous for use as positively locking mechanical connections, since no separate connecting elements are required for this purpose.

In a further refinement of the invention, the two half shells are connected to one another with an integral material joint. Suitable techniques for this purpose are, in particular, welding, soldering or bonding, in which case an appropriate weld can be produced using a circumferential weld bead, or else using spot welds.

In a further refinement of the invention, the steering wheel rim is formed by an integral metal sheet, in which case a joint line is provided on the external circumference of the steering wheel rim. The steering wheel rim is produced from an integral metal sheet by a rolling bending process about two axes, thus resulting in the desired, tubular structure. The joint line for those longitudinal edges of the metal sheet which are in contact with one another after the rolling and bending process is provided on the external circumference of the steering wheel rim. This reduces any risk of injury caused by impact of the driver's head. If the joint line were on the front face of the steering wheel rim facing the driver, this would result in a considerably greater risk of injury, if the longitudinal edges were to stand proud as a result of corresponding damage to the steering wheel rim, producing sharp cutting edges. Even when the steering wheel rim is formed from two half shells, the joint regions are respectively provided on the external and internal circumference of the steering wheel rim, so that the risk of injury on head impact is also reduced with this refinement.

The invention also relates to a method for producing a steering wheel rim for a steering wheel of a motor vehicle, which is provided with ventilation openings and is formed by a hollow body.

The object of the invention is thus also to provide such a method, which allows simple and stable production of a steering wheel rim with ventilation.

This object is achieved in that the steering wheel rim is formed by two metal sheets which are initially flat, in which case the ventilation openings are stamped in at least one metal sheet, the two metal sheets are then formed into corresponding half shells, and are finally connected to one another. A simple stamping process can be used to incorporate the ventilation openings in the flat metal sheet. If the ventilation openings were not to be incorporated until the metal sheet had been formed, then this would incur considerably greater production effort.

The object on which the method is based is also achieved in that the steering wheel rim is formed by an integral metal sheet, into which the ventilation openings are first of all stamped in the flat state and which is subsequently formed into a tubular structure by rolling bending about two axes, and is finally welded at the joint gap which is formed. The method according to the invention means that it is also possible to use an integral, flat metal sheet to produce a hollow body structure, and thus a steering wheel rim. Joining processes, in particular such as welds or crimped connections, are simplified by the presence of only a single, circumferential connecting joint (joint gap).

Other objects, advantages and novel features of the present invention will become apparent from the following detailed description of the invention when considered in conjunction with the accompanying drawings.

DETAILED DESCRIPTION OF THE DRAWINGS

Figure 1:
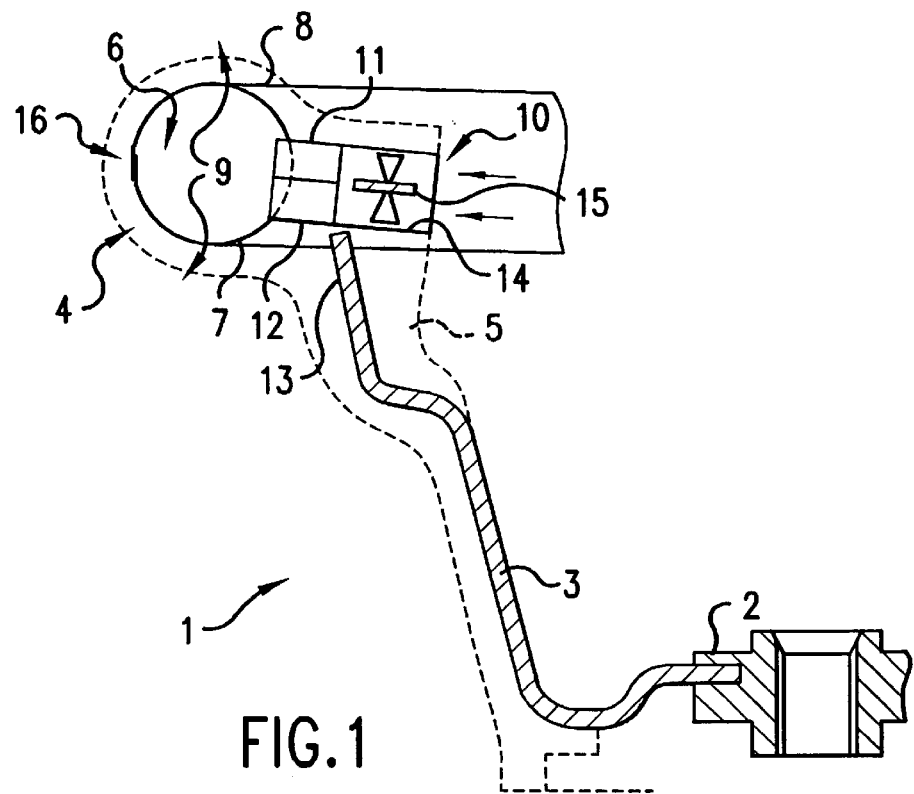
FIG. 1 shows a section through a part of one embodiment of a steering wheel according to the invention.

A steering wheel 1 is intended for use in a passenger vehicle and has a steering wheel hub 2 via which the steering wheel 1 can be fixed, in a manner known per se, to a steering column of a steering arrangement for the passenger vehicle. For this purpose, the steering wheel 1 has a steering wheel rim 4 which is designed as a closed ring and is connected to the steering wheel hub 2 via a supporting structure in the form of a spoke arrangement 3. The steering wheel rim 4 is designed as a self-supporting hollow body structure and has a circumferential annular cavity in its interior.

It is also contemplated to provide the steering wheel rim 4 with hollow chambers distributed only in some places around its circumference at the level of the normal gripping regions of the steering wheel rim 4, each of which hollow chambers has an associated fan module. If a plurality of cavities are thus provided within the steering wheel rim 4, which are not connected to one another in terms of flow but each have outlet openings, then each of these cavities has its own associated fan module.

The spoke arrangement is formed in a manner not shown in more detail by a plurality of spokes 3, which are each fixed to the steering wheel hub 2 and extend obliquely outwards and upwards. A supporting cup may also be provided as the supporting structure, instead of a spoke arrangement.

The steering wheel rim 4 is assembled from a lower half shell 7 and an upper half shell 8, in which case the two half shells 7, 8 define a self-supporting hollow body structure which needs no further stiffening, reinforcement, supporting structure or supporting body. Both the lower half shell 7 and the upper half shell 8 are each produced from a metal sheet, preferably from a sheet-steel part.

The spokes 3 in the illustrated exemplary embodiment are designed as steel spokes. However, cast light-alloy spokes may also be provided in the same way, and are connected by casting the steering wheel rim 4 around them in places.

The two half shells 7, 8 are joined together in such a way that they surround the cavity 6 forming a seal. The lower half shell 7 is welded, or firmly connected in some other way, to the respective spoke 3 in an attachment region 13. The steering wheel rim 4 is provided at the level of the spoke 3 with a mounting flange 11, 12 which is like a stub and is formed by two half-cylindrical shell sections 11, 12 (which project roughly radially inwards towards the axis) on the two half shells 7, 8. The shell sections 11, 12 are produced by appropriate forming of the two half shells 7, 8 and are matched to one another in such a way that, together, they produce a cylindrical holder. The cylindrical holder of the shell sections 11, 12 is used for fixing a fan module 10 which is composed of a tubular stub 14 as well as a fan 15 arranged inside the tubular stub 14. The fan 15 has an impeller which can be driven by means of an integrated or externally arranged drive unit. The illustration does not show the route of the corresponding power supply and control lines to the fan module 10. Wire-free lines may also be provided instead of lines with wires. The tubular stub 14 of the fan module 10 projects roughly radially inwards from the steering wheel rim 4. The steering wheel rim 4, together with the fan module 10, is encased by cushioning 5, which is known in principle.

Both the lower half shell 7 and the upper half shell 8 are provided with outlet openings 9, at least at the level of the gripping regions of the steering wheel rim 4. When the fan 15 in the fan module 10 is operated, air is sucked in in the direction of the arrow from the inlet of the tubular stub 14, and flows into the cavity 6. The air which has been sucked in emerges from the cavity 6, as a result of the corresponding flow pressure, through the outlet openings 9 (which are used as ventilation openings) to the exterior. The cushioning 5 is, of course, also interrupted in the region of the outlet openings 9, thus making it possible to achieve ventilation, and hence preferably cooling, of the gripping region of the steering wheel rim 4.

In order to produce the two half shells 7, 8, annular and flat metal sheets are in each case provided first of all, into which the corresponding outlet openings 9 are stamped, while they are flat. The outlet openings 9 are distributed irregularly around the circumference of the steering wheel rim 4 and, in particular, are concentrated in the gripping regions of the steering wheel rim 4. Once the outlet openings 9 have been stamped, the two half shells are in each case formed to the desired shape by means of suitable dies. The two half shells 7, 8 are then joined to one another and are firmly connected to one another both in the region of a connecting joint 16 on the external circumference of the steering wheel rim 4 and in the region of a connecting joint (which is not shown in any more detail but is used as a joint line) on the internal circumference of the steering wheel rim 4. In the exemplary embodiment illustrated in FIG. 1, the connection is produced by drawing a circumferential weld bead. However, the welding can also be carried out by spot welding, in the same way. Instead of a pure welding process for connecting the two half shells 7, 8, a crimping process or a combined crimping/welding process may also be provided.

Figure 2:
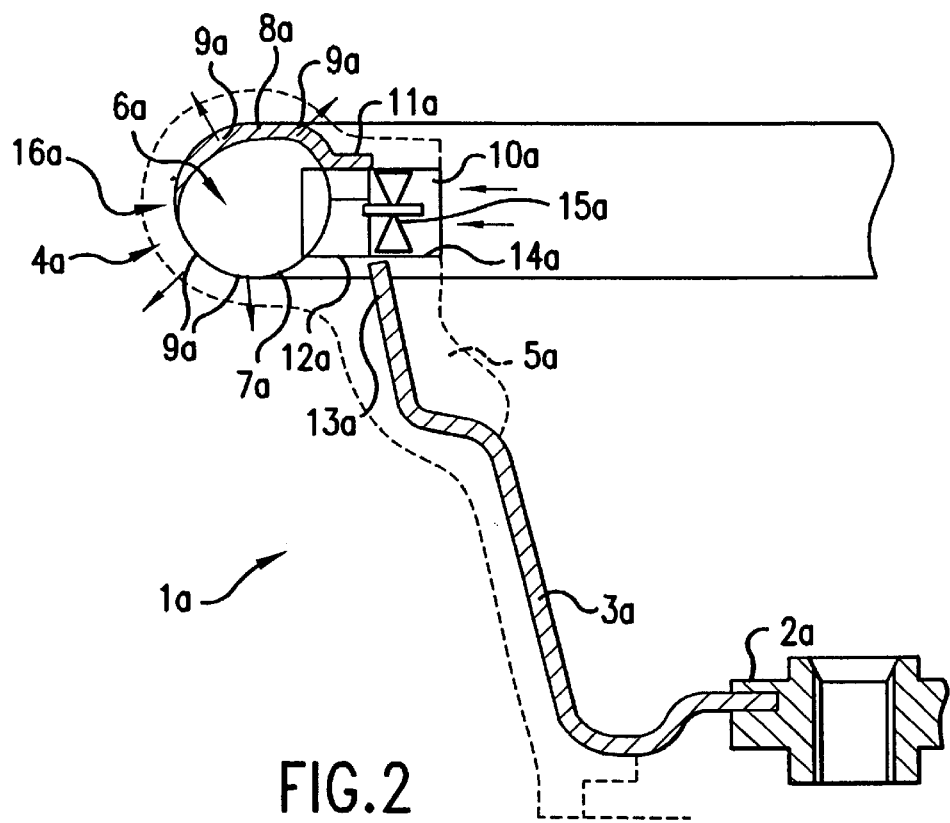
FIG. 2 shows a section, similar to FIG. 1, through a further embodiment of a steering wheel according to the invention.

The basic design of the steering wheel 1a shown in FIG. 2 corresponds to that of the steering wheel 1 shown in FIG. 1. Sections or parts of the steering wheel 1a having the same function are thus provided with the same reference symbols with the letter "a" added. The steering wheel rim 4a also has a lower half shell 7a and an upper half shell 8a in which case, although the lower half shell 7a is formed from a metal sheet, the upper half shell 8a is, in contrast, designed as an injection-molded plastic part. In this exemplary embodiment as well, the steering wheel rim 4a is connected to the spoke arrangement 3a via appropriate welding in attachment regions 13a of the lower half shell 7a. The upper half shell 8a, which is designed as an injection-molded plastic part, forms (in an analogous manner) on the one hand outlet openings 9a and on the other hand a shell section 11a for holding the fan module 10a. A major difference between the two exemplary embodiments shown in FIGS. 1 and 2 is, furthermore, that the upper half shell 8a is connected with a mechanical positive lock to the lower half shell 7a both in the region of the outer connecting joint and in the region of the inner connecting joint. The connection is produced both in the region of the outer connecting joint 16a and in the region of the inner connecting joint (which is not shown) by latching connections which are clipped to one another, by combined latching/crimped connections, or by pure crimping. In the case of crimping, as is illustrated in FIG. 2, a large number of appropriate apertures are provided distributed uniformly around the circumference in the upper half shell 8a, through each of which a flexible sheet-metal lug on the lower half shell 7a is pushed, and is then bent around. If latching connections are provided as an alternative or in addition, then corresponding latching cutouts are expediently provided in the region of the lower half shell 7a, and correspondingly elastically flexible latching hooks and/or latching tabs are provided in the region of the upper half shell 8a.

Figure 3:
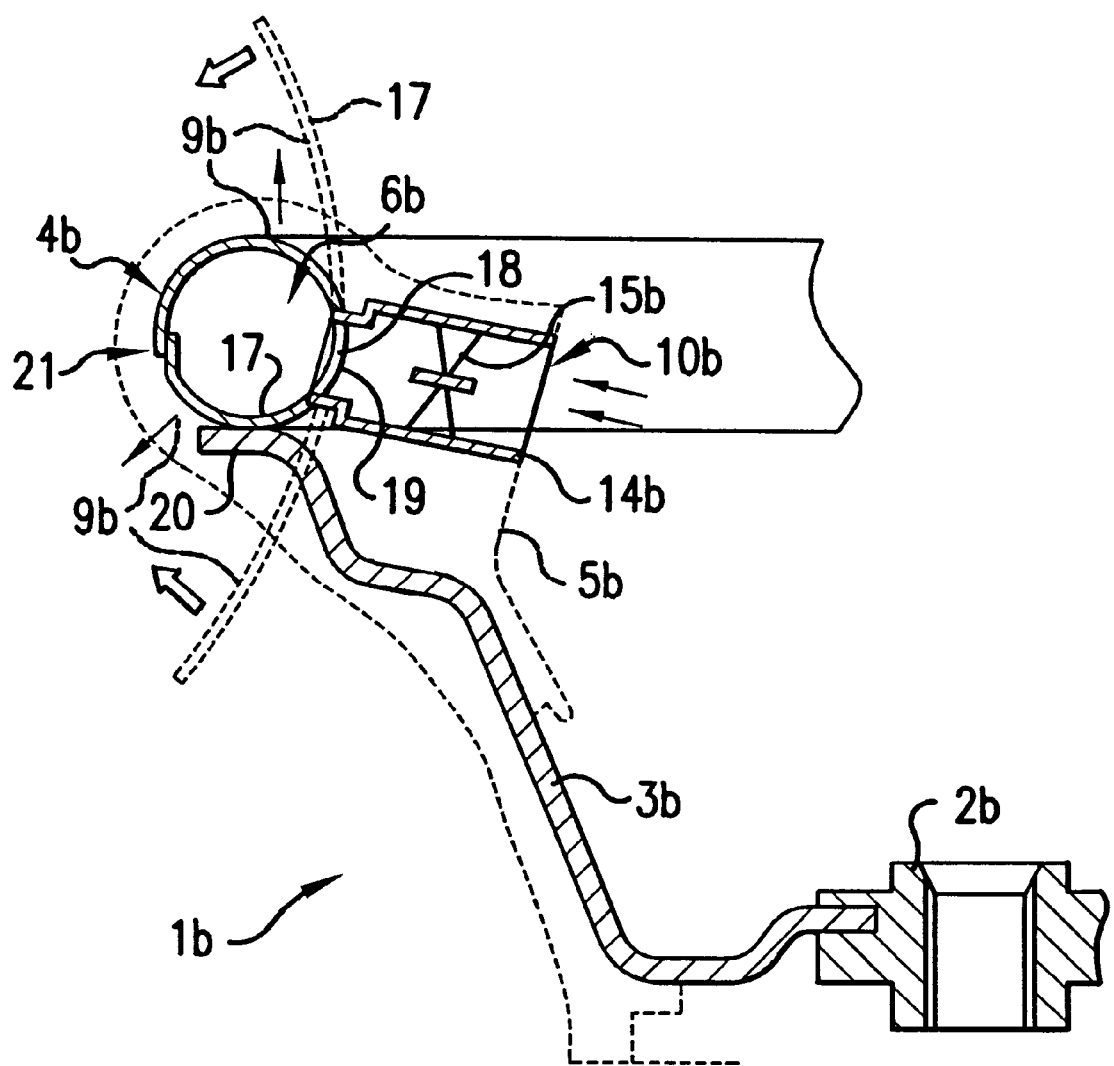
FIG. 3 shows a third embodiment of a steering wheel according to the invention, illustrated in a section similar to those in FIGS. 1 and 2.

In the case of the steering wheel 1b shown in FIG. 3 as well, parts and sections having the same function are provided with the same reference symbols as in the exemplary embodiments shown in FIGS. 1 and 2, but with the letter "b" added. The following text therefore refers only to the differences between the steering wheel 1b shown in FIG. 3 and the previous exemplary embodiments shown in FIGS. 1 and 2. The steering wheel rim 4b of the steering wheel 1b is not formed from two half shells but, in fact, with a single shell, by being produced from an integral metal sheet 17, in particular a steel sheet. The metal sheet 17 is designed to be flat and in the form of strips in the original state and has a width which corresponds roughly to the circumference of the steering wheel rim 4b. The outlet openings 9b are stamped into the metal sheet 17 at the appropriate points in the flat state. The metal sheet 17 is then rolled by use of a special forming process, so-called rolling bending, about two axes to form the desired tubular structure. The opposite ends of the tubular and annular structure that has been formed are then butt-welded to one another. In the region of the connecting joint 21, which is preferably formed on the external circumference of the steering wheel rim 4b, the corresponding longitudinal edges of the metal sheet 17 are welded and crimped to one another. The forming of the metal sheet 17 from the flat state is indicated by the dashed representation in FIG. 3 and the corresponding arrows.

In the same way, the rolling bending process can be used to produce the steering wheel rim 4b from an annular, flat metal sheet 17. In this method, the ends of the tubular structure are then not butt-welded, since the annular configuration of the metal sheet 17 itself produces the closed ring shape.

In order to allow flange connection of the fan module 10b, the steering wheel rim 4b has an aperture 18 on its internal circumference at the level of the corresponding spoke 3b, which aperture 18 is used as a holder and is preferably designed in the form of a circle. The aperture 18 is preferably produced by stamping when the metal sheet 17 is in the flat state. The tubular stub 14b of the fan module 10b is provided with an annular flange 19, which is welded all the way round to the edge of the aperture 18. The tubular stub 14b and thus the fan module 10b may, however, be detachably or non-detachably connected to the steering wheel rim 4b in some other suitable manner.

The steering wheel rim 4b is not provided with an appropriate attachment region for the connection to the respective spoke 3b, as is the case in the exemplary embodiments shown in FIGS. 1 and 2. In an exemplary embodiment according to FIG. 3, each spoke 3b in fact forms a contact section 20 on which the steering wheel rim 4b can be securely positioned. The contact region 20 is welded to the metal sheet 17 of the steering wheel rim 4b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering wheel for a motor vehicle, comprising:

a steering wheel hub;

a steering wheel rim coupled to said steering wheel hub via a spoke arrangement;

at least a portion of said steering wheel rim defining at least one interior cavity communicated with an exterior gripping region of the steering wheel rim via at least one ventilation opening defined in said steering wheel rim; and a holder for a fan module formed at the steering wheel rim such that the holder is located proximate said at least one interior cavity.

2. Steering wheel according to claim 1, wherein said steering wheel rim is a self-supporting hollow body.

3. Steering wheel according to claim 1, further comprising said fan module, said fan module being proximate an attachment region between said steering wheel rim and said spoke arrangement.

4. Steering wheel according to claim 1, wherein said steering wheel rim defines a plurality of said ventilation openings, said ventilation openings being concentrated in said exterior gripping region of the steering wheel rim.

5. Steering wheel according to claim 1, wherein the steering wheel rim comprises at least one sheet metal shell.

6. Steering wheel according to claim 5, wherein the steering wheel rim comprises two half shells which are connected to one another, a lower one of said half shells being coupled to the spoke arrangement, and an upper one of said half shells defining said at least one ventilation opening.

7. Steering wheel according to claim 6, wherein said upper half shell is an injection-molded plastic part.

8. Steering wheel according to claim 6, wherein said two half shells are mechanically connected to one another in a positively locking manner.

9. Steering wheel according to claim 6, wherein said two half shells are mechanically connected to one another with an integral material joint.

10. Steering wheel according to claim 5, wherein said steering wheel rim is formed from a single metal sheet.

11. Steering wheel according to claim 10, wherein said steering wheel rim is formed such that longitudinal edges of said single metal sheet are located on an external circumference of the steering wheel rim.

12. Steering wheel according to claim 11, wherein the single metal sheet is welded proximate said longitudinal edges to form said a connecting joint.

* * * * *